July 7, 1931.   C. C. LAURITSEN   1,813,541
CIRCUIT CONTROL SYSTEM FOR RADIO APPARATUS
Filed May 7, 1925   2 Sheets-Sheet 1

INVENTOR
Charles C. Lauritsen
BY
ATTORNEY

Patented July 7, 1931

1,813,541

UNITED STATES PATENT OFFICE

CHARLES C. LAURITSEN, OF ST. LOUIS, MISSOURI, ASSIGNOR, BY DIRECT AND MESNE ASSIGNMENTS, TO COLIN B. KENNEDY INCORPORATED, OF ST. LOUIS, MISSOURI, A CORPORATION OF MISSOURI

CIRCUIT CONTROL SYSTEM FOR RADIO APPARATUS

Application filed May 7, 1925. Serial No. 28,557.

In a radio receiving apparatus it is common to employ vacuum tubes whose filaments are supplied with current from a storage battery, and to also employ rectifiers whereby the battery may be charged from the alternating current lighting circuit which is usually available. Also, rectifying devices connected to the lighting circuit are sometimes in use in lieu of "B" batteries for supplying the plate current. The proper use of these devices has heretofore required considerable attention on the part of the operator in that the rectifiers for supplying the plate current have to be connected and disconnected each time the apparatus is used; the battery charger can not be in service while the receiving set is in use; and when to connect and disconnect the battery charger in order that the battery charge be not allowed to fall too low, or the battery be injured by overcharging, is a matter concerning which many users of radio receiving sets have little or no knowledge. Also, since battery charging has required attention, it has been usual to employ batteries of rather large capacity in order that frequent charging will not be necessary.

The object of my invention is to provide an apparatus which will automatically keep the battery charged, automatically stop the charging operation if it should be going on at the time tube filaments are connected to the battery preparatory to use of the receiving set; to control the connecting to the alternating current line of the rectifier for furnishing the plate current, if one is used; and to secure all of the foregoing results without the addition of any manually operated controlling switches.

In addition to the fact that apparatus constructed in accordance with my invention requires no attention on the part of the operator other than the mere opening and closing of the filament switch, it makes possible the use of a much smaller, and therefore less expensive, storage battery.

Figure 1:
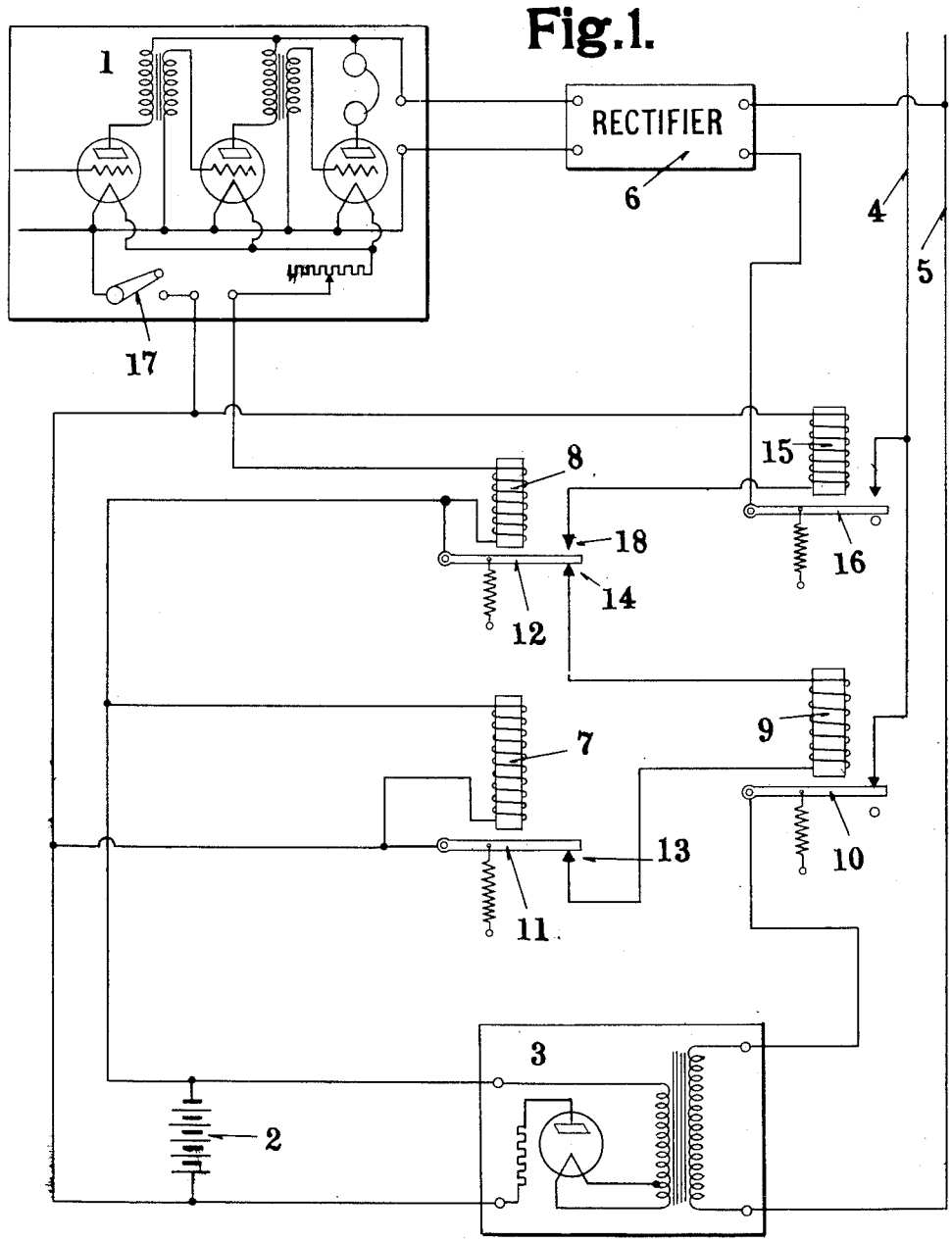
Figure 2:
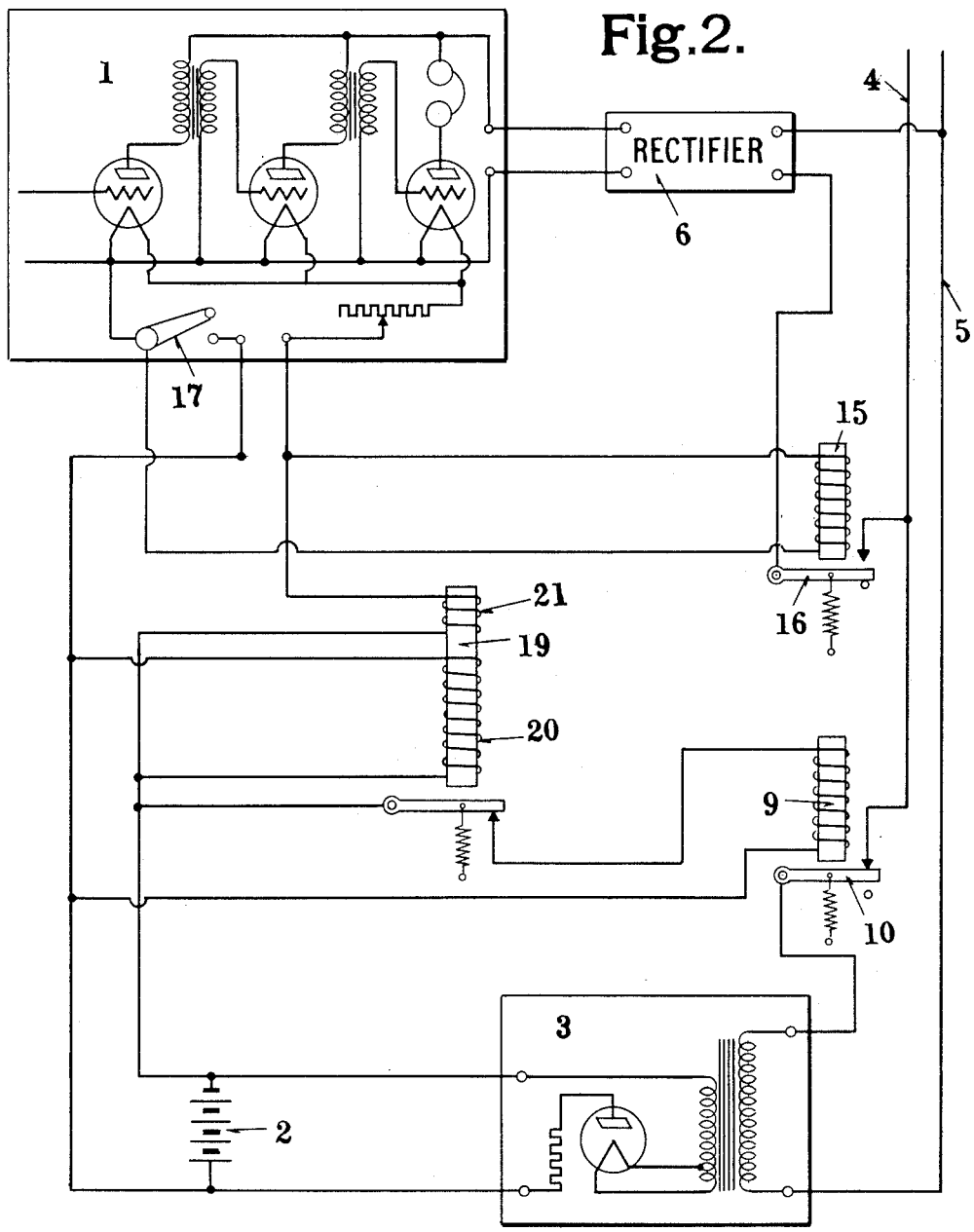

In the accompanying drawings Figure 1 diagrammatically illustrates a circuit control system embodying my invention, and Figure 2 illustrates a modification.

Referring to Figure 1, 1 diagrammatically indicates a receiving set having one or more tubes (three being shown in the figures), filament current being supplied to these tubes from the storage battery 2. The output terminals of the rectifying device 3 are also connected to the terminals of the battery, the input terminals being connected to alternating current supply mains 4, 5. 6 represents a rectifier connected in the plate circuits of the tubes and to the alternating current supply line. A voltage relay 7, comprising a plurality of turns of fine wire, is connected to the battery 2 in parallel with the consumption circuit which comprises the tube filaments, and a current relay 8 is connected in series in this consumption circuit. A relay 9 operates a switch 10 to control the connection of the alternating current supply line to the rectifier 3 and therefore the operation of the rectifier to charge the battery. The coil of the relay 9 is supplied with current from the battery through switch 11, which is the armature of relay 7, and switch 12, which is the armature of relay 8. The springs of the armature switches 11, 12 tend to hold these switches on contact points 13 and 14 respectively, and therefore in closed position with respect to the circuit of the coil of relay 9. Relay 15 is also supplied with current from the battery and control switch 16 by means of which the rectifier 6 is connected and disconnected from the alternating current supply line. The tube filaments are connected and disconnected from the battery by the usual filament switch 17, which is the only manually operated switch required.

The coil of relay 8 is so proportioned that it will attract its armature 12 when the smallest current suitable for the operation of the tube is flowing in the filament circuit, and the coil of relay 7 is so proportioned with relation to its armature spring that when the voltage of the battery (assuming a three-cell battery) falls to approximately 5.8 volts the magnetic pull of the relay becomes less than the pull of the spring on the armature 11, and the circuit of the coil 9 is closed at the contact point 13. Assuming that at this time the filaments are not connected to the battery and therefore the armature switch 12 stands on contact point 14, the circuit of the relay 9 is closed whereby armature switch 10 is closed and the battery charging rectifier 3 is put into operation. The air gap between the armature switch 11 and the core of the relay 7, when the switch is in its closed position, is so dimensioned that the armature will not be attracted and the coil of relay 9 opened until the battery charging voltage has been brought up by the charging operation to the value it assumes when the battery is charged.

Assuming that the charging operation happens to be going on at the time it is desired to use the receiving set, the mere closing of the filament switch preparatory to the use of the set will stop the charging operation in that current will then flow through current relay 8 and the circuit of the coil 9 will be opened at contact 14 due to the relay 8 attracting its armature 12, and the switch 10 will then open. When the filament switch is turned off relay 8 releases armature switch 12 thereby closing relay circuit 9 and again initiating the charging operation.

From the foregoing it will also be apparent that turning the filament switch on and off results in the rectifier 6, supplying the plate current, being connected and disconnected from the alternating current supply, since when the current flows in the consumption circuit the relay 8 attracts its armature switch 12 and places the coil of relay 15 in circuit with the battery through contact 18, whereupon armature 16 will be drawn to closed position and connect the rectifier 6 to the alternating current line.

The apparatus of Figure 2 is similar to that of Figure 1, the difference being that the current relay and the voltage relay are replaced by a single relay 19 having voltage coil 20 and current coil 21. A further difference consists in connecting relay 15 to the battery in parallel with the tube filaments whereby the filament switch also controls the circuit of this relay.

Since the rectifiers referred to may be of any one of various known types, and their specific construction forms no part of my invention, detailed description of them is unnecessary.

Having fully described my invention, what I claim as new and desire to secure by Letters Patent of the United States is:

1. In an apparatus of the class described, the combination of a storage battery, a thermionic tube, switching means for connecting the battery in circuit with the tube filament, a source of alternating current and a current rectifier connected to the battery, a second current rectifier connected in the plate circuit of the tube and to the alternating current source, and means governed by the switching means for connecting the last mentioned rectifier to the alternating current source and disconnecting the first mentioned rectifier from said source.

2. In combination, a radio receiving system, a power supply circuit including means for supplying B current to the receiving system, an automatic means responsive to current conditions in said receiving system, for disconnecting said first means from said power supply circuit when the receiving system is de-energized and for closing circuit to said first means when said receiving system is energized.

3. In combination, a radio receiving system comprising a vacuum tube, a filament energizing circuit including an A battery and a switch, a power supply circuit including means for supplying B current to the receiving system and a second means for charging said A battery, and automatic means controlled according to the position of said switch for selectively opening and closing circuit to said first and second means.

4. In combination, a radio receiving system comprising a vacuum tube, a filament energizing circuit including an A battery and a switch, a power supply circuit including means for supplying B current to the receiving system and a second means for charging said A battery, and a relay influenced by said filament energizing circuit for selectively opening and closing circuit to said first means to supply B current when the filament energizing circuit is closed, and close circuit to the A battery charging means when the filament energizing circuit is open.

5. In combination, a radio receiver comprising thermionic tubes, a current supply battery for said tubes, a source of charging current for said battery, means responsive to the potential of said battery for connecting the charging source therewith, and means actuated when the radio receiver is taken into use for disabling said last mentioned means.

6. The combination of a wireless set having vacuum tubes, rectifying apparatus for supplying power to the tubes, and means adapted to automatically control the connection of the rectifying device to a source of alternating current, said means being responsive to the operative condition of the tubes.

In testimony whereof, I have hereunto set my hand this 23rd day of April, 1925.

CHARLES C. LAURITSEN.